United States Patent [19]

Ahlbrandt

[11] 4,446,110
[45] May 1, 1984

[54] TREATING THE SURFACE OF ARTICLES BY ELECTRICAL BRUSH DISCHARGE

[76] Inventor: Andreas Ahlbrandt, 17 Uhlandstrasse, Lauterbach, Fed. Rep. of Germany, 6420

[21] Appl. No.: 237,969

[22] Filed: Feb. 25, 1981

[30] Foreign Application Priority Data

Oct. 23, 1980 [DE] Fed. Rep. of Germany ....... 3039951

[51] Int. Cl.³ .............................................. B01K 1/00
[52] U.S. Cl. ................................ 422/186.05; 204/164
[58] Field of Search ............. 422/186.04, 186, 186.05, 422/186.06, 186.22, 186.11, 186.20; 204/157.1 R, 157.1 H, 176, 164

[56] References Cited

U.S. PATENT DOCUMENTS

| | | | |
|---|---|---|---|
| 2,881,470 | 4/1959 | Berthold | 422/186.05 |
| 3,396,308 | 8/1968 | Whitmore | 422/186.05 |
| 3,409,537 | 11/1968 | Cannon | 422/186.05 |
| 3,484,363 | 12/1969 | Williams | 422/186.05 |
| 3,622,492 | 11/1971 | Kinney | 204/176 |
| 3,632,299 | 1/1972 | Thorsen | 422/186.05 |
| 4,051,044 | 9/1977 | Sörensen | 422/186.05 |
| 4,153,560 | 5/1979 | Dinter | 422/186.05 |
| 4,209,357 | 6/1980 | Gorin | 422/186.05 |
| 4,275,301 | 6/1981 | Rueggeberg | 204/164 |
| 4,291,226 | 9/1981 | Rueggeberg | 204/164 |
| 4,334,144 | 6/1982 | Ferrarini | 219/383 |

FOREIGN PATENT DOCUMENTS 2550810  5/1977  Fed. Rep. of Germany .

Primary Examiner—M. J. Andrews
Assistant Examiner—J. J. Zimmerman
Attorney, Agent, or Firm—Quarles & Brady

[57] ABSTRACT

Apparatus for treating the surface of articles such as foils, plates or molded articles by electric brush discharge comprises a first electrode for guiding articles to be treated and at least one facing brush electrode having a quartz coating, which can be connected to opposite potential and is arranged to be cooled by a cooling air flow flowing over the outside thereof. Guide means are provided for guiding the cooling air flow at least partly through the corona along the active discharging side of the brush electrode.

7 Claims, 2 Drawing Figures

TREATING THE SURFACE OF ARTICLES BY ELECTRICAL BRUSH DISCHARGE

BACKGROUND OF THE INVENTION

This invention relates to an apparatus for treating the surface of articles such as foils, plates or molded articles by electric brush discharge, which apparatus comprises a first electrode for guiding the articles to be treated and at least one facing brush electrode having a quartz coating, which can be connected to opposite potential and is cooled by a cooling air flow flowing over the outside thereof.

Such an apparatus is known from German Offenlegungsschrift No. 2,550,810. The efficiency of the known apparatus is limited by the fact that in the case of a too high operating voltage a breakdown occurs between the electrodes instead of the desired shower of sparks and the apparatus is held automatically switched off. This effect is aided by the fact that the electrical conductivity of the quartz coating of the brush electrode increases with increasing quartz temperature. If the quartz coating is hotter at one point that in the remaining area, the energy exchange is concentrated at this point. It therefore gets hotter and a breakdown rapidly occurs leading also to a minute hole in the quartz coating and consequently to the deterioration thereof.

It has been found that the efficiency of such apparatus can be significantly increased if a good cooling of the active discharging side of the brush electrode is ensured.

SUMMARY OF THE INVENTION

The primary object of the invention is to provide means for cooling the active discharging side of a brush electrode.

According to the invention, there is provided apparatus for treating the surface of articles such as foils, plates or molded articles by electric brush discharge, said apparatus comprising a first electrode for guiding articles to be treated and at least one facing brush electrode having a quartz coating, which can be connected to opposite potential and is arranged to be cooled by a cooling air flow flowing over the outside thereof, wherein guide means are provided for guiding the cooling air flow at least partly through the corona along the active discharging side of said brush electrode.

Naturally, the manner in which the air is guided according to the invention leads to the production of more ozone than in the known apparatus, because the air flows directly through the shower of sparks. However, as the cooling air represents spent air, said higher ozone proportion can be accepted without difficulty. It must also be remembered that the ozone increases the effect obtained by the apparatus, so that a better pre-treatment of the articles is achieved.

The advantages of the invention mainly result from the fact that unlike in the known apparatuses the air sucked in no longer flows only laterally onto the brush electrodes and instead flows directly through the discharging area and consequently along those points where the maximum heat occurs. As a result, there is a very intense heat exchange. Consequently, the apparatus can be operated with a relatively high efficiency without electrical breakdowns occurring.

As a result of the invention, there is no need for the hitherto required drive for the brush electrodes which rotates the latter about their longitudinal axis so that discharge does not always take place from the same side and consequently cause excessive heating. Thus, in addition to improved operation, the apparatus according to the invention is simpler and cheaper than the known apparatuses. As the brush electrode according to the invention does not have to be mounted in rotaty manner within the apparatus, it can be supported at a number of points along its entire length by simple means, so that even in the case of a small brush electrode cross-section, there is no risk of the brush electrode bending or sagging.

If, according to a first advantageous embodiment, the brush electrode has a discharge surface facing the first electrode, it becomes particularly suitable for high efficiency levels, because the articles to be treated are moved by a wide-area spark shower rather than a spark curtain. This permits high feed speeds, without there being any risk of non-uniform or inadequate treatment.

In a particularly appropriate, but simple construction of the apparatus according to the invention, the brush electrode is a double electrode formed from two juxtaposed single electrodes and an air exhausting pipe is provided, said single electrodes forming part of a wall of said air exhausting pipe and air inlets being formed between the said brush electrodes and between said electrodes and the sides of said air exhausting pipe the cross-section of the air inlet between said brush electrodes being larger than the cross-sections of the air inlets located between the brush electrodes and the longitudinal sides of said air exhausting pipe. This arrangement is particularly suitable for treating foils on a cylindrical electrode. The single electrodes are very well cooled, on the one hand through circulating the maximum cooling air quantity through the area in which the heat to be removed is formed and on the other hand by partial air flows along the outsides of the single electrodes.

Preferably, the air exhausting pipe has two insulators longitudinally covering the brush electrodes and further outwards in the vicinity of said single brush electrodes diaphragms made from an electrically conductive material which are spaced from said insulators and fixed to a header. This arrangement ensures in simple manner that the apparatus does not cause radio interference.

The diaphragms desirably form part of a shaped member which is open towards the brush electrodes. The brush electrodes are desirably positioned by flat spacers, which fill the free cross-section between said insulators and have at their end faces recesses which receive and retain said single brush electrodes. The single brush electrodes are preferably held in the said recesses by angular claws, one leg of each said claw engaging against the outside of a respective insulator and the other leg of each claw engaging against a respective electrode, said claws being secured in position by means of respective screws guided in said respective insulators. These constructionally advantageous measures permit a rational, precise manufacture of the apparatus and with acceptable technical expenditure.

According to another embodiment of the invention, the brush electrode has a rectangular cross-section and the first electrode guiding the articles to be treated has a planar surface which guides the articles and faces said brush electrode. This embodiment is advantageous if the apparatus is to work foils or plates at high speed.

The brush electrode may be reversibily fixed in the apparatus and the discharging surface may be planar or concave, being adapted to the surface of the first electrode. This arrangement is suitable both for cylindrical counter-electrodes and for counter-electrodes with a planar surface for guiding the articles to be treated.

Preferably, the cooling air flow is formed by an air exhausting device on one side of the brush electrode and a compressed air supply device on the other side of said brush electrode. A particularly intense cooling is obtained by this arrangement since the cooling air flow in this case forces the articles to be treated away from the brush electrode. This keeps fluff in the case of fluffy material or oils and other particles away from the brush electrode, so that they cannot burn to ash on the brush electrode.

The cooling device has a particularly low energy consumption if, according to a further embodiment of the invention, the compressed air cooling device is provided on the material intake side of the apparatus and the cooling air moves in the same direction as the material.

The cooling of the brush electrode is further improved if part of the cooling air flow is passed through said brush electrode.

The coils or webs to be treated can be moved particularly easily under the brush electrode if the first electrode guiding them is connected to a compressed air source and has a plurality of small discharge openings facing towards the brush electrode. An air cushion effect is obtained through the outflowing air, which is particularly important at high feed speeds.

To protect the quartz electrode from mechanical damage, it is advantageous if the first electrode is movably mounted, so that e.g. in the case of material compressions, it can easily move aside due to its low weight.

BRIEF DESCRIPTION OF THE DRAWINGS

The invention will now be further described, by way of example, with reference to the accompanying diagrammatic drawings, in which.

DESCRIPTION OF PREFERRED EMBODIMENTS

Figure 1:
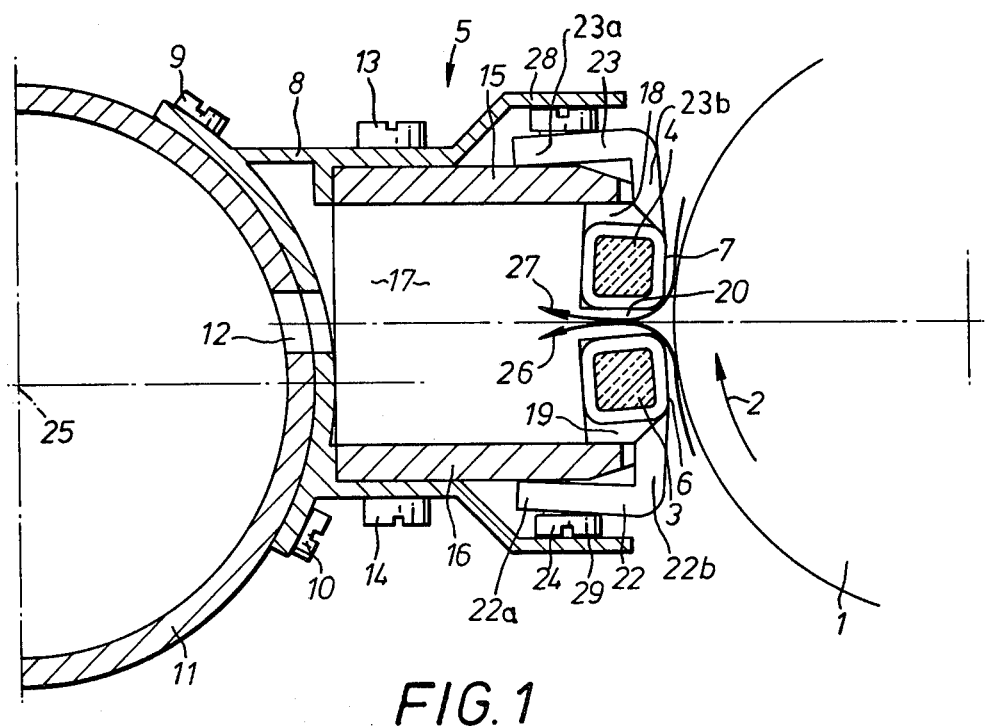
FIG. 1 is a cross-section through the operationally important part of a first embodiment of an apparatus according to the invention.

FIG. 1 shows part of a first electrode constructed in cylindrical manner and which, when the machine is operating, is capable of rotating in the direction of arrow 2.

The electrode 1 is preferably applied to earth potential and on it rests, e.g., a foil (not shown) to be treated in the apparatus.

Two juxtaposed single electrodes 3 and 4, directly adjacent to the first electrode 1, together form a brush electrode and are held in an air exhausting pipe 5. These single electrodes 3,4 are coated with quartz and can be connected to the high voltage potential of a transformer, the high voltage being selected in such a way that the air is ionized between the single electrodes 3,4 and the first electrode 1, so that a brush discharge occurs. As a result, the sparks can strike the surface being treated and the desired surface treatment is obtained.

The single electrodes 3 and 4 have an approximately square cross-section and are arranged in such a way that one circumferential surface is always tangential to the first electrode 1 and consequently always forms a respective discharge surface 6 or 7.

The air exhausting pipe 5 comprises an aluminum or other material shaped member 8 and is open towards the single electrodes 3,4. At the end remote from the single electrodes 3 and 4, the pipe 5 is screwed by means of screws 9 and 10 to a header 11. A plurality of holes 12 in the header 11 and shaped member 8 make it possible for air to pass from the air exhausting pipe 5 into the header 11.

Two insulators 15,16 made from electrically non-conductive material are fixed by means of respective screws 13,14 to the longitudinal sides of the shaped member 8. Over the length of the single electrodes 3,4 and between the insulators 15,16, a plurality of spacers 17 are provided having recesses 18,19 on either side for receiving the electrodes 3,4 and projecting between the latter by a web 20.

Claws 22,23 serve respectively to hold the single electrodes 3,4 in the recesses 18,19. To this end, the claws 22,23 are constructed in angular manner and in each case one leg 22a or 23a engages externally with the insulator 14 or 16 whilst the other leg 22b or 23b engages on the electrode 3 or 4 respectively. Screws 24 serve to hold the claws 22,23 against the respective insulator 16 or 15 and secure the electrodes 3,4 with the necessary force in the respective recesses 18,19.

An important feature of the apparatus is the vertical displacement of the first electrode 1 and the single electrodes 3,4 with respect to the header 11. The header 11 is pivotally mounted about a pivot axis running parallel to the single electrodes 3,4. As a result, the air exhausting pipe 5 can swing away upwards in the drawing. To prevent this movement causing a jamming effect, the centre of a lower single electrode 3 in the drawing should be at or above the height of the axis 25, so that the electrode 3 is immediately removed from the first electrode on pivoting about said axis 25.

For the correct cooling of the electrodes 3 and 4, it is important that between them there is a free air intake cross-section into the pipe 5 which is greater than the sum of the free cross-section between the electrodes 3,4 and the insulators 15,16. As a result, a considerably proportion of the air flows past the active discharging side of the electrodes 3,4 into the air exhausting pipe 5, as illustrated in the drawing by arrows 26,27.

To prevent radio interference as a result of the brush discharges of the single electrodes 3,4, the air exhausting pipe 5 is screened to the outside by diaphragms 28,29. These diaphragms are at earth potential. It is important that they are spaced from insulators 15,16 at least in the vicinity of the single electrodes 3,4.

It is to be stressed that it is naturally also possible, instead of sucking air into the air exhausting pipe 5, for air to be forced out of it. The exhausting pipe then becomes a blowing pipe, the air flow once again being guided along the active discharging area of the single electrodes 3,4. It would then naturally be necessary to provide a separate air suction, so that the ozone-enriched air cannot pass into the surrounding air. The invention is also intended to cover such an embodiment. However, the drawings show and the claims refer to an exhausting pipe, because with the present state of the art, such a construction would be most readily accepted under practical conditions.

Figure 2:
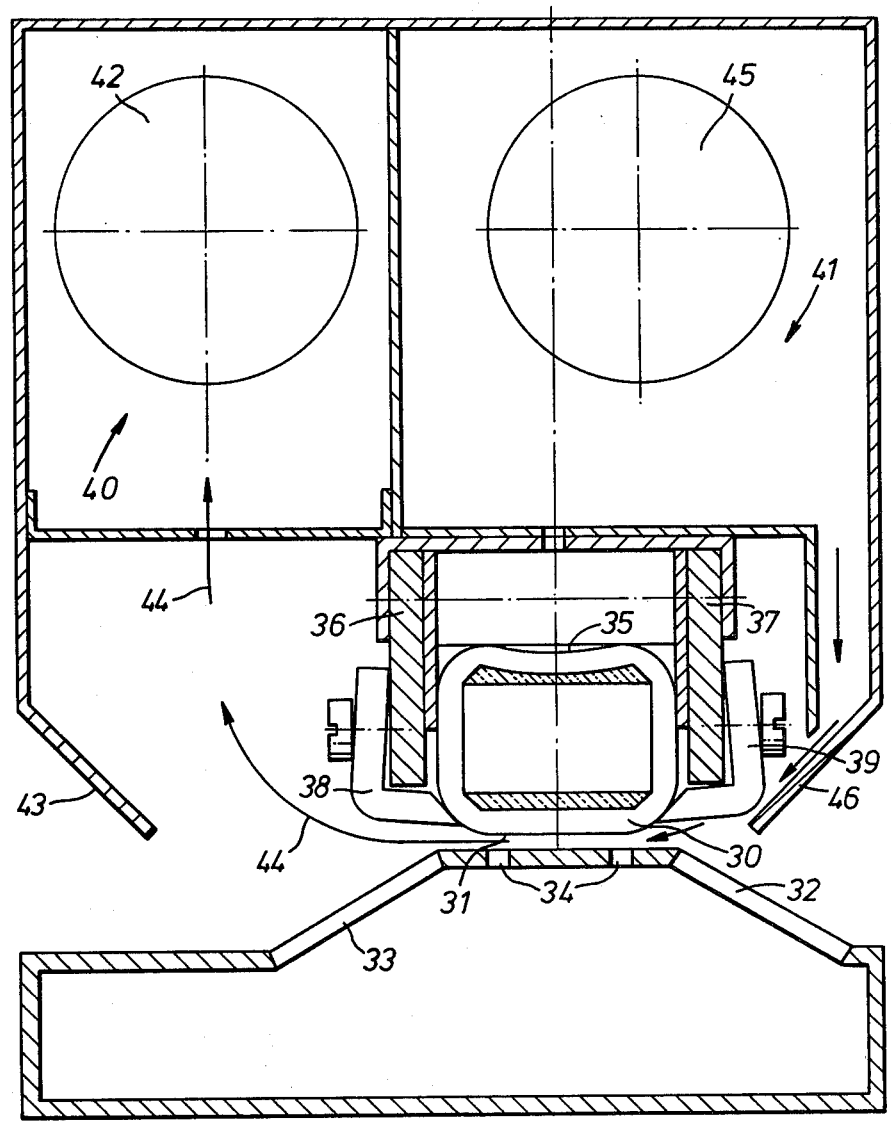
FIG. 2 is a cross-section through the operationally important part of a second embodiment of an apparatus according to the invention.

The apparatus shown in FIG. 2 has a simple, box-like brush electrode 30 with a substantially rectangular cross-section. One of its circumferential surfaces represents a discharging surface 31 and faces an electrode 32 which is connected to earth potential. The electrode 32 is connected to a compressed air source 33. On its side facing the discharging surface 31 and which serves to freely guide a foil or plate to be treated, a plurality of small discharge openings 34 are provided, so that articles guided on the electrode 32 are in a state of suspension in operation. The electrode 32 can be mounted in a movable manner, in order to accommodate materials of varying thicknesses. This prevents mechanical damage to the quartz electrode.

In exactly the same way as the single electrodes 3,4 in the first embodiment, the brush electrode 30 is held by means of claws 38,39 between two insulators 36,37. The brush electrode 30 is cooled by an air exhausting device 40 and a compressed air supply device 41. The air exhausting device 40 comprises an air intake pipe 42, which is positioned above and/or laterally of the brush electrode 30. An air guidance device 43 ensures that air is sucked between the discharging surface 31 and the electrode 32 and passes in the direction of the arrow 44 into the air intake pipe 42.

Besides the air intake pipe 42, the compressed air supply device 41 has a compressed air pipe 45 from which compressed air flows along an air guidance device 46 and in an inclined manner from above onto the electrode 32 and/or onto articles guided thereon. This air is drawn in by the air intake pipe 42. The drawings do not show that for further cooling of the brush electrode 30, a partial air flow or some other cooling medium can be passed through it.

On operating the apparatus, the brush electrode 30 is connected to a voltage supply. Articles to be treated are guided on the electrode 32. Air flowing out of discharge openings 34 in the electrode 32 ensures that the articles are in a state of suspension. A cooling air flow flows continuously through the corona between discharging surface 31 and the first electrode 32 or the foil or plate guided thereon. As the discharging surface 32 is relatively wide, the articles to be treated pass through a relatively large area shower of sparks, so that they are intensely treated.

It should be noted that the invention is not restricted to the above described embodiments but modifications may be made without departing from the spirit and scope of the invention as defined by the appended claims.

I claim:

1. Apparatus for treating the surface of materials by electric brush discharge, said apparatus comprising a first electrode for guiding articles to be treated and at least one facing brush electrode having a coating, which can be connected to opposite potential and is arranged to be cooled by a cooling air flow flowing over the outside thereof, wherein guide means are provided for guiding the cooling air flow at least partly through the corona along the active discharging side of said brush electrode, and in which the brush electrode is a double electrode formed from two juxtaposed single electrodes and in which an air exhausting pipe is provided, said single electrodes forming part of a wall of said air exhausting pipe and air inlets being formed between the said brush electrodes and between said electrodes and the sides of said air exhausting pipe the cross-section of the air inlet between said brush electrodes being larger than the cross-sections of the air inlets located between the brush electrodes and the longitudinal sides of said air exhausting pipe.

2. Apparatus as claimed in claim 1, in which said air exhausting pipe has two insulators longitudinally covering the brush electrodes and further outwards in the vicinity of said single brush electrodes diaphragms made from an electrically conductive material which are spaced from said insulators and fixed to a header.

3. Apparatus as claimed in claim 2, in which said diaphragms form part of a shaped member which is open towards said brush electrodes.

4. Apparatus as claimed in claim 2, in which said brush electrodes are positioned by flat spacers, which fill the free cross-section between said insulators and have at their end faces recesses which receive and retain said single brush electrodes.

5. Apparatus as claimed in claim 4, in which said single brush electrodes are held in said recesses by angular claws, one leg of each said claw engaging against the outside of a respective insulator and the other leg of each claw engaging against a respective electrode, said claws being secured in position by means of respective screws guided in said respective insulators.

6. Apparatus for treating the surface of materials by electric brush discharge, said apparatus comprising a first electrode for guiding materials to be treated and at least one facing brush electrode having a coating, which can be connected to opposite potential and is arranged to be cooled by a cooling air flow flowing over the outside thereof, wherein guide means are provided for guiding the cooling air flow at least partly through the corona along the active discharging side of said brush electrode, in which said brush electrode has a discharging surface facing said first electrode, and the first electrode guiding the material to be treated has a surface which guides the material and faces said brush electrode, and in which part of the cooling air flow is passed through said brush electrode.

7. Apparatus for treating the surface of materials by electric brush discharge, said apparatus comprising a first electrode for guiding materials to be treated and at least one facing brush electrode having a coating, which can be connected to opposite potential and is arranged to be cooled by a cooling air flow flowing over the outside thereof, wherein guide means are provided for guiding the cooling air flow at least partly through the corona along the active discharging side of said brush electrode, in which said brush electrode has a discharging surface facing said first electrode, and the first electrode guiding the materials to be treated has a surface which guides the materials and faces said brush electrode, and in which the first electrode guiding the materials to be treated is connected to a compressed air source and has a plurality of small discharge openings facing towards the brush electrode.

* * * * *